(12) United States Patent
Srivastava et al.

(10) Patent No.: US 11,289,091 B2
(45) Date of Patent: Mar. 29, 2022

(54) CONTEXTUAL VOICE-BASED PRESENTATION ASSISTANCE

(71) Applicant: Microsoft Technology Licensing, LLC, Redmond, WA (US)

(72) Inventors: Amit Srivastava, San Jose, CA (US); Dachuan Zhang, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 16/548,233

(22) Filed: Aug. 22, 2019

(65) Prior Publication Data
US 2021/0056973 A1    Feb. 25, 2021

(51) Int. Cl.
| G10L 15/26 | (2006.01) |
| G06F 3/16 | (2006.01) |
| G10L 15/18 | (2013.01) |
| G10L 15/22 | (2006.01) |
| H04N 5/232 | (2006.01) |

(52) U.S. Cl.
CPC ............. *G10L 15/26* (2013.01); *G06F 3/167* (2013.01); *G10L 15/1815* (2013.01); *G10L 15/22* (2013.01); *H04N 5/23296* (2013.01); *G10L 2015/223* (2013.01); *G10L 2015/228* (2013.01)

(58) Field of Classification Search
CPC . G06F 3/00; G06F 3/167; G10L 15/00; G10L 15/22; G10L 15/26; G10L 15/1815; G10L 2015/223; G10L 2015/228; H04N 5/00; H04N 5/23296
See application file for complete search history.

(56) References Cited

U.S. PATENT DOCUMENTS

| 9,116,989 | B1 | 8/2015 | Ehlen et al. | |
| 2013/0227434 | A1* | 8/2013 | Jones | H04L 67/306 |
| | | | | 715/753 |
| 2015/0379094 | A1* | 12/2015 | Ehlen | G06F 3/038 |
| | | | | 707/722 |
| 2017/0092273 | A1* | 3/2017 | Roberts | G06N 5/02 |

(Continued)

OTHER PUBLICATIONS

Huang, et al., "ConKMeL: A Contextual Knowledge Management Framework to Support Intelligent Multimedia e-Learning", In Proceedings of the Fifth International Symposium on Multimedia Software Engineering, Dec. 10, 2003, 9 Pages.

(Continued)

*Primary Examiner* — Daniel C Washburn
*Assistant Examiner* — Sean E Serraguard
(74) *Attorney, Agent, or Firm* — Alleman Hall Creasman & Tuttle LLP

(57) ABSTRACT

Examples are disclosed that relate to methods and computing devices for providing voice-based assistance during a presentation. In one example, a method comprises receiving content of a slide deck, processing the content of the slide deck, and populating a contextual knowledge graph based on the content of the slide deck. A voice input is received from a presenter. Using the knowledge graph, the voice input is analyzed to determine an action to be performed by a presentation program during the presentation. The action is translated into one or more commands executable by the presentation program to perform the action, and the one or more commands are sent to a client device executing the presentation program.

20 Claims, 13 Drawing Sheets

(56) References Cited

U.S. PATENT DOCUMENTS

| | | | |
|---|---|---|---|
| 2018/0007340 A1* | 1/2018 | Stachowski | H04N 13/354 |
| 2018/0052884 A1* | 2/2018 | Kale | G06F 16/24578 |
| 2018/0060028 A1* | 3/2018 | Carr | G06F 3/0304 |
| 2018/0122371 A1* | 5/2018 | Vangala | G06F 40/295 |
| 2019/0087780 A1* | 3/2019 | Cerqueira | G06K 9/00456 |
| 2019/0279615 A1* | 9/2019 | Ben-Dor | G10L 13/00 |
| 2020/0105251 A1* | 4/2020 | Meshram | G10L 15/05 |
| 2020/0244380 A1* | 7/2020 | Agrawal | G06F 3/0482 |

OTHER PUBLICATIONS

Huang, et al., "Contextual Knowledge Representation, Retrieval and Interpretation in Multimedia e-Learning", In Proceedings of the IEEE International Conference on Information Reuse and Integration, Oct. 27, 2003, pp. 258-265.

"International Search Report & Written Opinion Issued in PCT Application No. PCT/US20/037981", dated Sep. 11, 2020, 12 Pages.

* cited by examiner

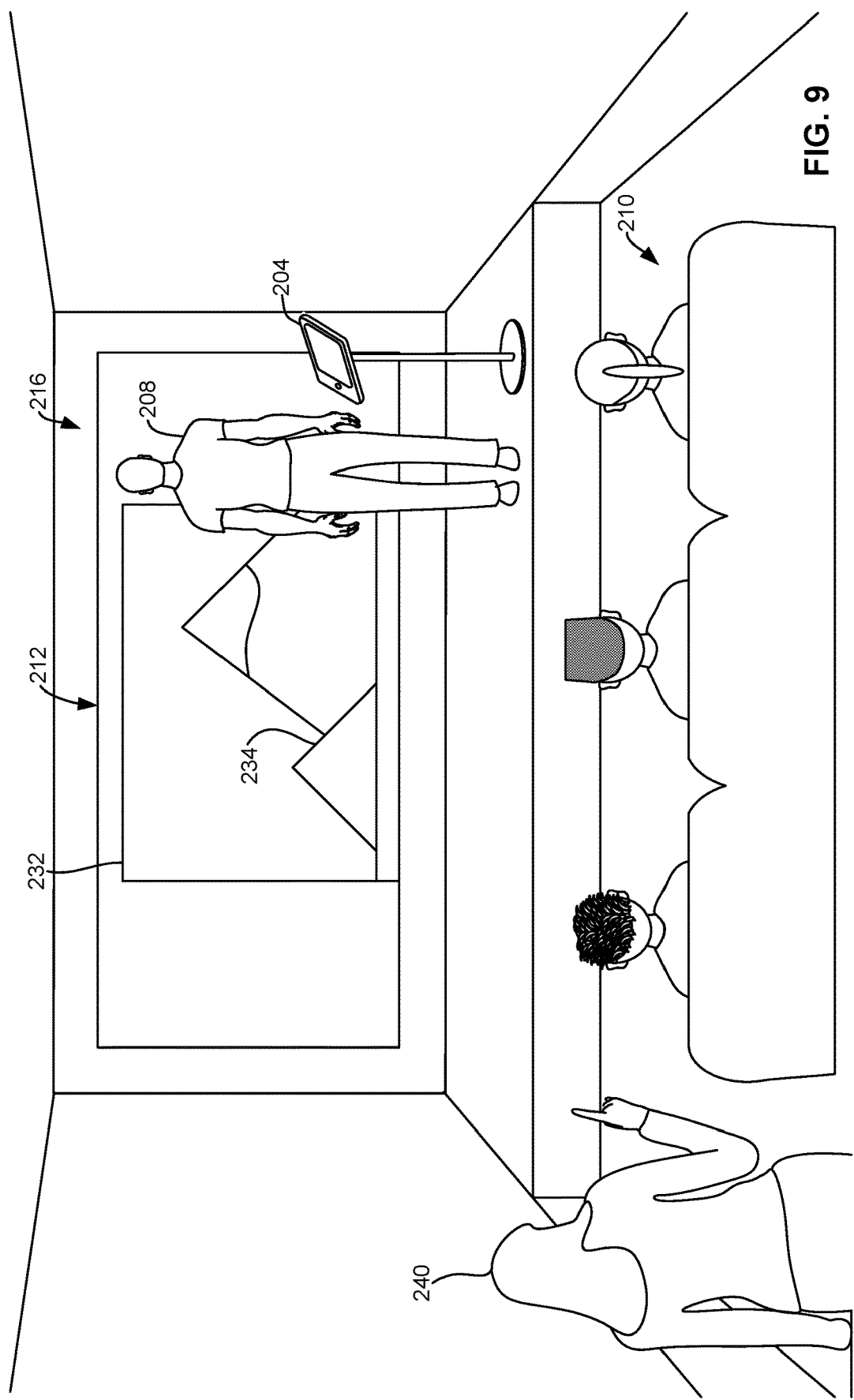

CONTEXTUAL VOICE-BASED PRESENTATION ASSISTANCE

BACKGROUND

Presentation programs allow a presenter to perform a variety of tasks while displaying images, text and/or videos during a presentation. Simple tasks, such as advancing a slide deck to a next slide, returning to a previously viewed slide, and initiating animations, often may be accomplished without interrupting the presentation. More complex operations, such as adding notes, finding a slide that contains a given content item, and navigating between slides in a non-linear order, may be challenging to perform without terminating or otherwise interrupting the presentation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to methods and computing devices for providing voice-based assistance during a presentation. In one example, a method comprises receiving content of a slide deck, processing the content of the slide deck, and populating a contextual knowledge graph based on the content of the slide deck. A voice input is received from a presenter. Using the knowledge graph, the voice input is analyzed to determine an action to be performed by a presentation program during the presentation. The action is translated into one or more commands executable by the presentation program to perform the action, and the one or more commands are sent to a client device executing the presentation program.

Another example provides a computing device comprising a logic subsystem and memory storing instructions. The instructions are executable by the logic subsystem to receive content of a slide deck, process the content of the slide deck, and populate a contextual knowledge graph based on the content of the slide deck. The instructions are further executable to receive a voice input from a presenter. Using the knowledge graph, the voice input is analyzed to determine an action to be performed by a presentation program during a presentation. The action is translated into one or more commands executable by the presentation program to perform the action. The instructions are further executable to control the presentation program to execute the one or more commands. Display output resulting from execution of the one or more commands is sent to a client device.

BRIEF DESCRIPTION OF THE DRAWINGS

FIG. 9 shows an example of zooming into an image according to examples of the present disclosure.

DETAILED DESCRIPTION

Presentation programs allow a presenter to perform a variety of tasks while displaying images, text and/or videos during a presentation. Simple tasks, such as advancing to a next slide, returning to a previously viewed slide, and initiating animations, may be easily performed by the presenter during the presentation. For example, the presenter may press a button on a remote control to advance to the next slide. More complex operations, however, such as adding notes, finding a slide that contains a given content item, selecting or highlighting content items, and navigating between slides in a non-linear order, may be challenging to perform without terminating or otherwise interrupting the presentation. For example, to add a note to a particular slide, a presenter may be forced to pause her presentation, direct her attention to a computing device running the presentation program, and then compose and enter the desired note via a keyboard, mouse, touchscreen and/or other user input device. In another example, to locate a particular slide having certain content within a large slide deck, the presenter must pause her presentation, return to her computing device, and scroll through the entire presentation or otherwise manually search for the desired content. Such interruptions are disruptive and distracting to audience members, and negatively impact the presenter's performance.

Furthermore, current presentation programs are unable to utilize content of a slide deck and/or other contextual data related to a presentation to execute a presenter's intended action, such as navigating to a specific slide containing desired content, or to a prior slide that elicited a particular question from the audience.

Accordingly, examples are disclosed that relate to methods and computing devices for providing content-aware voice-based assistance during a presentation. As described in more detail below, using the voice-based assistance techniques of the present disclosure, a presenter may conveniently and in real-time carry out complex tasks that can leverage content of a slide deck and other contextual data without disrupting her presentation.

Figure 1A:
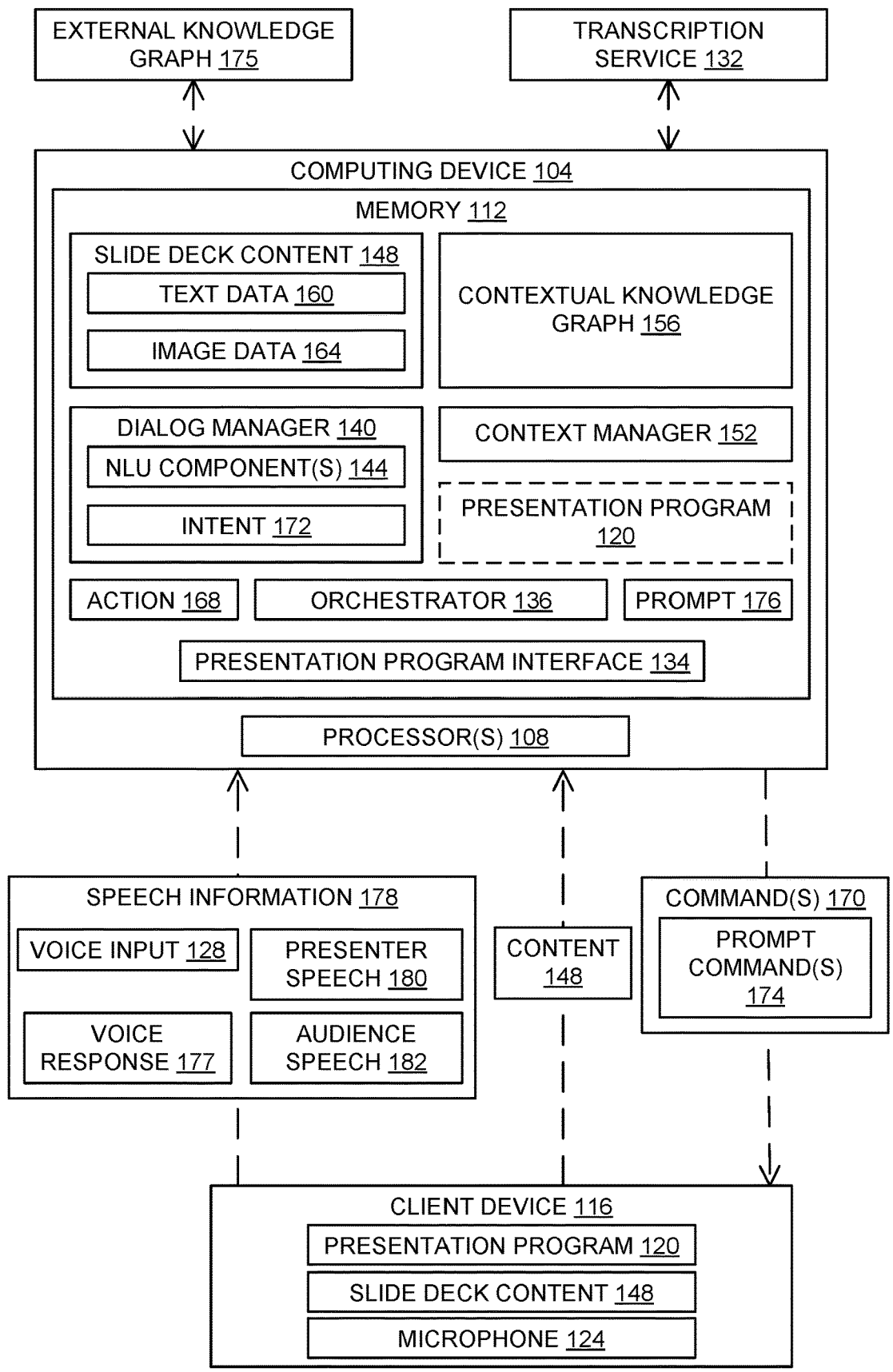
FIG. 1A shows a block diagram illustrating an example system for providing voice-based assistance during a presentation according to examples of the present disclosure.

With reference now to FIG. 1A, in one example, a computing device 104 comprises one or more processor(s) 108 and a memory 112 storing instructions executable by the processor(s) 108 to provide voice-based assistance during a presentation as described herein. In some examples, the computing device 104 comprises a network server. For example, the computing device 104 may be configured to provide the voice-based assistance as a network-based or cloud service to one or more connected devices.

In other examples, the computing device 104 may comprise an edge computing device, a personal computing device (e.g. a laptop or tablet computing device), a mobile computing device, a mobile communication device (e.g. a smart phone), or any other suitable computing device. It will also be appreciated that aspects of the computing device 104 may be distributed across one or more computing devices. For example, a cloud service provider may operate two or more servers, each of which may perform separate aspects of the computing device 104. Additional details regarding the components and computing aspects of computing device 104 are described in more detail below with reference to the example computing system of FIG. 11.

Figure 2:
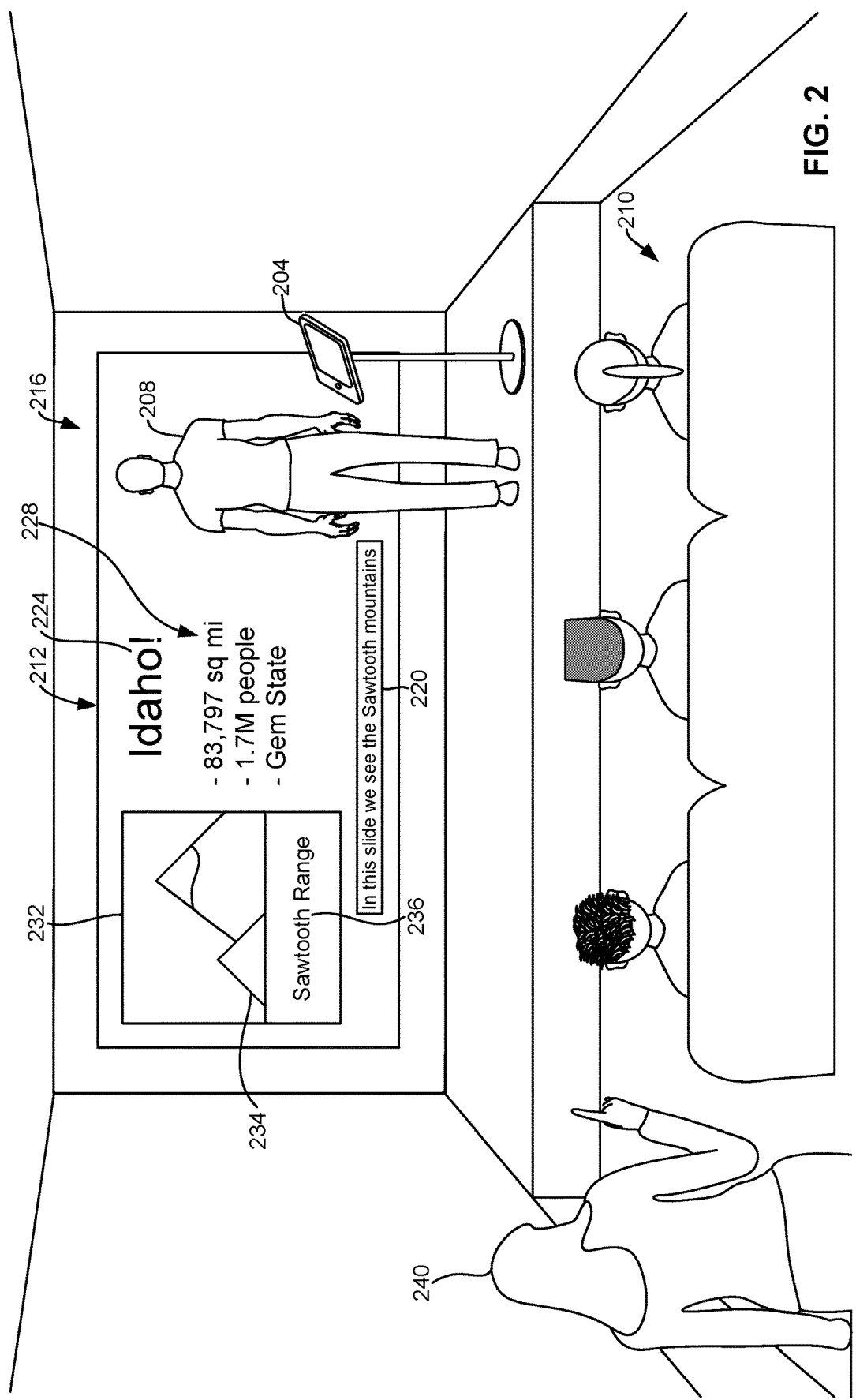
FIG. 2 shows an example of a tablet computing device being used by a presenter to deliver a presentation to an audience according to examples of the present disclosure.

As described in the use case examples provided below, the computing device 104 may be communicatively coupled with a client device 116 via a network, such as a LAN or the Internet. The client device 116 may be a user computing device, such as a laptop computing device, a tablet computing device, or a smartphone being operated by a presenter. FIG. 2 shows one example of a client device 116 in the form of a tablet computing device 204 being used by a presenter 208 to deliver a presentation to an audience 210. In the example of FIG. 2, the presentation comprises a slide 212 being displayed on a wall 216 (e.g. via a projector).

With reference again to FIG. 1A, the client device 116 is configured to execute a presentation program 120 that enables a presenter to deliver a presentation. The presentation program 120 may take any suitable form. For example, the presentation program 120 may comprise instructions stored in a memory of the client device 116. In other examples, the presentation program 120 may comprise a web-based application that is executed via a browser, and the client device 116 may receive display data resulting from the execution of one or more commands via the presentation program 120. In these examples, the web-based presentation program 120 may be controlled to generate and send display output to the client device 116.

The presentation program 120 may include a plurality of features for creating and editing a slide deck, as well as displaying the slide deck and navigating through the slide deck during a presentation. In some examples, the presentation program 120 comprises voice-based features. For example, and with reference again to FIG. 2, the presentation program may generate a caption 220 that provides a textual representation of speech from the presenter 208.

The client device may receive voice input and other speech information in any suitable manner. For example, and with reference again to FIG. 1A, the client device 116 comprises a microphone 124. In some examples, the microphone 124 may comprise an internal microphone, an external microphone, or a microphone array. The microphone 124 may receive speech information 178 such as a voice input 128 from the presenter. The voice input 128 may then be used by the client device 116 and/or the computing device 104 to provide voice-based features as described herein.

In some examples, the client device 116 may offload voice processing and analysis to one or more other computing devices (e.g. a server) having more robust computational capacities. In this manner, the other computing device(s) may carry out requested processing tasks more quickly than the client device and provide the client device with additional features and capabilities. Furthermore, offloading processing tasks may extend a battery life of the client device during a presentation. For example, and as described in more detail below, in some examples speech information 178 received by client device 116 is processed by a transcription service 132.

It will also be appreciated that aspects of the computing device 104 described herein may be additionally or alternatively implemented at the client device 116. Likewise, aspects of the client device 116 may be additionally or alternatively implemented at the computing device 104. In this manner and in different examples, any or all of the processes described herein may be practiced entirely locally at a client device, entirely remotely from the client device, or by any combination of local and remote devices.

In the example of FIG. 1A, the client device 116 is configured to transmit the voice input 128 to the computing device 104 via a network as described above. In some examples, the client device 116 may transmit the voice input 128 in the form of raw audio data. In other examples, the client device 116 may perform one or more processing tasks, such as to transform the audio data, compress the audio data, perform noise processing, and/or process input from a microphone array.

With reference again to the example of FIG. 1A, the computing device 104 may receive the voice input 128. Upon its receipt, the voice input 128 may be routed to a transcription service 132. In some examples, the computing device 104 may host the transcription service 132 locally. In other examples, the transcription service 132 may be provided by one or more devices other than the computing device 104, such as cloud-based devices. In yet other examples, aspects of the transcription service 132 may be distributed between the computing device 104 and the one or more other devices. In some examples, transcription service 132 may receive voice input 128 and other speech information 178 directly from client device 116.

The transcription service 132 is configured to transcribe the voice input 128 into text or other suitable data structures (e.g. strings). Transcription service 132 may utilize any suitable speech recognition techniques to process the voice input 128 and other speech information 178 captured by client device 116. In some examples, audio data received by the transcription service 132 from client device 116 may be transformed by a feature extractor into data for processing by a speech recognition engine. A matrix of multiple feature vectors extracted by the feature extractor may be provided to the speech recognition engine for processing. The feature extractor may utilize any suitable dimensionality reduction techniques to process the audio data and generate feature vectors. Example techniques include using mel-frequency cepstral coefficients (MFCCs), linear discriminant analysis, deep neural network techniques, etc.

The speech recognition engine may compare the feature vectors with acoustic models for speech sounds (e.g., speech components). In some examples, the speech recognition engine may comprise an acoustic representation generator (e.g., acoustic modeler) that evaluates the similarity of a spoken utterance represented by one or more feature vectors to acoustic models of language sounds. The acoustic models may comprise data that matches pronunciations of speech components, such as phonemes, to particular words and/or phrases. The speech recognition engine also may compare the feature vectors and other audio data with sequences of sounds to identify words and/or phrases that match the spoken sounds of the audio data.

In some examples, the speech recognition engine may utilize Hidden Markov models (HMMs) to match feature vectors with phonemes and/or other speech components. Each state of an HMM may comprise a statistical distribution that is a mixture of diagonal covariance Gaussians, which may indicate a likelihood for each observed vector. Each phoneme or word may have a different output distribution. Individual HMMs for separate phonemes and words may be combined to create an HMM for a sequence of phonemes or words.

Using the speech recognition engine, feature vectors and other speech recognition data may be processed to generate recognized text, such as a real-time transcription of speech information received by client device 116. In other examples, any suitable techniques for matching feature vectors to phonemes and/or other speech components may be utilized, as well as other types and forms of speech recognition functionality.

In some examples, the transcription service 132 may operate in real-time or near-real-time during a presentation. For example, the transcription service 132 may receive speech inputs from the presenter and output text in real-time as the presenter is speaking. As described in more detail below, output from the transcription service 132 may be used to analyze the corresponding speech information to determine an action to be performed by a presentation program during a presentation. Further and as described below, content of the presenter's slide deck is also processed and used to populate a contextual knowledge graph 156, which is then analyzed with the corresponding speech information to determine the action to be performed.

In the example of FIG. 1A, the computing device 104 comprises a presentation program interface 134 that receives and routes various inputs from the client device 116 to modules in the computing device and/or external services, such as transcription service 132 or external knowledge graph 175. The presentation program interface 134 also may route data, such as commands 170, audio and video data, from such modules and external services to client device 116. In some examples, presentation program interface 134 routes speech information 178 to the transcription service 132, and routes slide deck content 148 to an orchestrator 136.

The orchestrator 136 routes one or more inputs, such as the voice input 128, to one or more appropriate modules of the computing device 104. As one example, the computing device 104 may receive voice input 128 from the client device 116 via the orchestrator 136. The orchestrator 136 may also direct the voice input 128 to the transcription service 132. The orchestrator 136 may also route one or more outputs to one or more destinations. For example, the computing device 104 may receive transcription output from the transcription service 132 via the orchestrator 136, and the orchestrator 136 may direct the transcription output to the client device 116 or to any applicable modules of the computing device 104 for further processing.

As described in more detail below, in some examples the computing device 104 may process speech information 178, including voice input 128 from a user (presenter) of the presentation program 120, to provide voice-based assistance to the user during a presentation. For example, the computing device 104 may comprise a dialog manager 140 configured to process speech information 178. The dialog manager 140 may receive voice input 128 or a transcribed representation of the voice input 128 from the transcription service 132 via the orchestrator 136. The dialog manager 140 may be further configured to forward the voice input 128 or the transcribed representation of the voice input 128 input to one or more natural language understanding (NLU) components 144.

As described in more detail below, the one or more natural language understanding (NLU) components 144 may be configured to analyze speech information 178, such as voice input 128 or the transcribed representation of the voice input 128, to identify actions, commands, intents, and/or other information related to the speech information. Additionally, and in one potential advantage of the present disclosure, the computing device 104 leverages a contextual knowledge graph 156 populated with slide deck content 148 to support content-aware inferencing and other content-based tasks.

In some examples, the computing device 104 is configured to receive and process content 148 of a slide deck to populate the contextual knowledge graph 156. In some examples, the content 148 may comprise a copy of the slide deck (e.g. as a ".ppt" or ".pptx" formatted file). It will also be appreciated that the content 148 may take any other suitable form, such as a subset of data extracted from the slide deck, or a set of metadata describing the slide deck.

In some examples, the computing device 104 may receive the content 148 from the presentation program 120. For example, the presentation program 120 may make the content 148 available to the computing device 104 when a user saves a copy of the slide deck. In another example, the presentation program 120 may provide the content 148 to the computing device 104 when the user initiates a command to enable voice-based assistance.

Figure 1B:
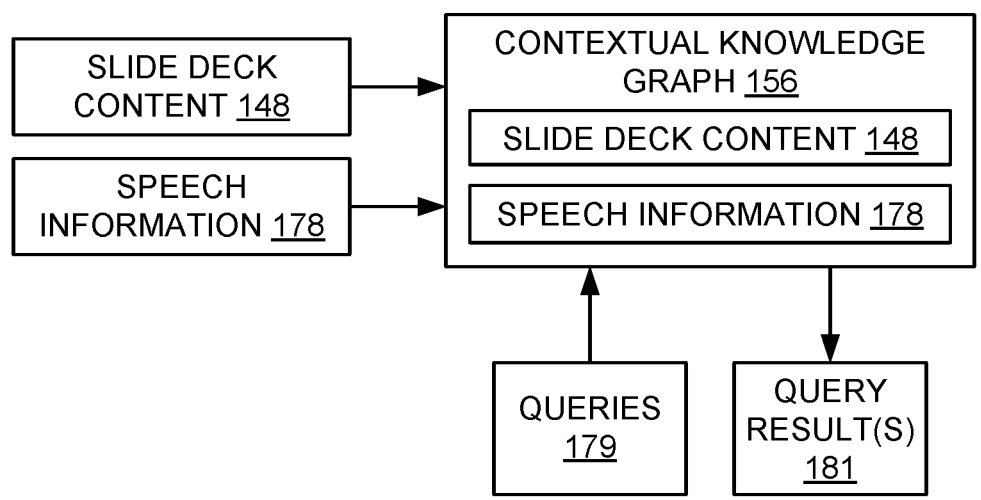
FIG. 1B illustrates an example of data flow with respect to a contextual knowledge graph according to examples of the present disclosure.

The computing device 104 may receive the content 148 via the presentation program interface 134 and orchestrator 136, which may route the content 148 to a context manager 152. The context manager 152 is configured to process the content 148 to extract and index information, and to populate contextual knowledge graph 156. For example and with reference now to FIG. 1B, the contextual knowledge graph 156 is populated with information from the slide deck content 148 and speech information 178. In this manner and as described in more detail below, dialogue manager 140 and NLU component(s) 144 may access the contextual knowledge graph 156 via queries 179 and utilize the slide deck content 148 and/or the speech information 178 to generate one or more query results 181 that may be used to determine an action to be performed by the presentation program 120.

In different examples, the NLU(s) 144 may implement one or more suitable techniques to populate the contextual knowledge graph 156. For example, the NLU(s) 144 may utilize entity extraction, entity co-reference resolution, entity disambiguation, and/or relation extraction techniques. One or more of these techniques may be used to analyze structured content of slides, such as text in titles, bodies, captions, text boxes, callouts, etc., along with the text from time-aligned speech information 178 (audio that aligns to specific slides) to extract tuples (e.g., subject-relationship-predicate). The extracted tuples may then be stored in a graphical database structure in the contextual knowledge graph 156.

For example, the NLU(s) 144 may use entity extraction techniques to locate and classify elements from text into pre-determined categories. The NLU(s) 144 may utilize entity co-reference resolution techniques to identify particular mentions in a text that refer to the same entity. The NLU(s) 144 may utilize entity disambiguation techniques to assign unique identities to entities that are mentioned in text. The NLU(s) 144 may utilize relation extraction techniques to identify and classify semantic relationship mentions within a set of data, such as text.

It will be appreciated that, once initialized, the contextual knowledge graph 156 may be updated periodically (e.g. at regular intervals of time) or continuously (e.g. in real-time or in near-real-time). For example, the context manager 152 may process the content 148 as content items are added, removed, or changed at the client device 116 and sent to computing device 104, and may integrate updated information into the contextual knowledge graph 156.

The contextual knowledge graph 156 may store and describe the content 148 using a format amenable to being queried by the dialogue manager 140 and NLU component(s) 144. For example, the contextual knowledge graph 156 may store information in the form of semantic triples. Each semantic triple comprises three fields or nodes: a location identifier node, a piece of information node, and a relation node (e.g. describing a relationship between the location and the piece of information). As one example, semantic triple "(10, "FY 2020 Roadmap", title)" may be used to specify that "FY 2020 Roadmap" is the title of slide 10 in a slide deck. In different examples, the information node may comprise text data 160 (e.g. "FY 2020 Roadmap"), metadata, semantic descriptors or classifications of other information, such as image data 164, and other information from content 148. As illustrated in the example of FIG. 2, suitable examples of text data may include, but are not limited to, a title 224 of the slide 212 and one or more items of text information 228 on the slide 212. In different examples, the "relation" node may comprise the title, body, caption, notes, or other component or parameter of a slide.

With reference again to FIG. 1A and as noted above, the content 148 may additionally or alternatively comprise image data 164, such as still images or video. In the example of FIG. 2, examples of image data 164 include image 232 within slide 212 and a caption 236 within the image 232.

With reference again to FIG. 1A, in some examples image data 164 may be processed and indexed into contextual knowledge graph 156 using classification techniques to generate descriptive information. It will also be appreciated that the image data 164 may be processed in any other suitable manner. Accordingly, the contextual knowledge graph 156 also may be populated with information based at least in part on image data 164 within slide deck content 148.

Additionally, and as described in more detail below, computing device 104 may also populate the contextual knowledge graph 156 with speech information 178 captured by the client device 116. Such speech information may comprise presenter speech 180 spoken by the presenter, audience speech 182 spoken by one or more audience members, voice inputs 128 that may represent commands for the presentation program 120, and voice responses 177 to prompts or queries generated by computing device 104.

As noted above, and in one potential advantage of the present disclosure, the contextual knowledge graph 156 is used by computing device 104 to analyze voice inputs 128 and determine an action 168 to be performed by the presentation program 120 during a presentation. As described in more detail below, the action 168 may be translated into one or more commands 170 executable by the presentation program 120 to perform the action.

To process speech information 178 received from the client device 116, the dialog manager 140 forwards a transcribed representation of the voice input 128, such as text, from the transcription service 132 to the NLU(s) 144. As noted above, the NLU(s) 144 are configured to analyze the transcribed representation and identify actions, commands, intents, and/or other information provided therein. In some examples, the NLU(s) 144 implement semantic reasoners to infer logical deductions from a set of given facts in a command to identify inferred information in the contextual knowledge graph 156 to execute the command for the user. As described in more detail below, this may enable the understanding and execution of a wide variety of commands in which information is more implicit and is based on an intersection of speech information 178 that was spoken earlier and/or slide deck content 148.

The dialog manager 140 interprets the output of the NLU(s) 144 and determines what action(s) 168 to take based on such output. The action(s) 168 may take the form of a high-level representation of a command or generic call and its parameters to be executed by the presentation program 120. As described in more detail below, data representing the action(s) 168 is then passed back to orchestrator 136 which converts this data to actual function calls to the presentation application 120 that are communicated to the client device 116.

As one potential use-case example, the presenter 208 of FIG. 2 may provide a voice input 128 comprising the phrase "show me the slide with the picture of the mountains." The dialog manager 140 analyzes this phrase using the contextual knowledge graph 156 to determine an action 168 to be performed by the presentation program 120. In one example, the contextual knowledge graph 156 may comprise a relationship triple indicating that the image 232 in slide 212 depicts mountains 234. In another example, the contextual knowledge graph 156 may additionally or alternatively comprise a relationship triple indicating that the caption 220 in slide 212 includes the word "MOUNTAINS." In these examples, the dialog manager 140 uses its analysis of the voice input to search the contextual knowledge graph 156 and identify slide 212 as the intended slide. Accordingly, the action 168 determined by the computing device may comprise an instruction for the presentation program 120 to display the slide 212 depicted in FIG. 2.

In some examples, analyzing the voice input 128 to determine the action 168 includes determining an intent 172 of the voice input 128. For example, the one or more NLU components 144 may be configured to determine whether speech information 178 is a command intended to control the presentation program 120. In some examples, the one or more NLU components 144 may use a multi-class N+1 intent classification model to determine if the intent 172 is associated with a presentation intent class that corresponds to a command intended to control the presentation program 120. In other examples, rule-based techniques, hybrid models using rule-based techniques plus classification models, or any other suitable methods for determining an intent may be utilized.

As one example of a potential use-case scenario, a user may provide a voice input to "turn down the air conditioning." In this example, the one or more NLU component(s) 144 may determine that the voice input is not a command intended to control the presentation program 120. As another illustrative use-case example, a user of the presentation program 120 (e.g., a presenter) may provide a voice input comprising the phrase "take me to the fiscal year 2020 roadmap slide." The NLU component(s) 144 analyze this phrase and determine that it is a command intended to control the presentation program 120. In this example, the intent 172 comprises an explicit "change slide" intent and an implicit or sub-intent to search for a slide containing a title equal to the string "fiscal year 2020 roadmap." The one or more NLU components 144 may perform an information extraction step that extracts the portion "fiscal year 2020 roadmap" and identifies this portion as the search phrase to be searched. Accordingly, the NLU component(s) 144 may query the contextual knowledge graph 156 to find a slide that matches the search phrase "fiscal year 2020 roadmap."

In one example, the NLU component(s) 144 initially may search only the title fields/nodes in the contextual knowledge graph 156 for the search phrase. If one slide is found having the search phrase in the title field/node, then the NLU component(s) 144 select this slide as satisfying the implicit/sub-intent. If no slide is located having the search phrase in the title field/node, then the NLU component(s) 144 may search other fields/nodes for parameters or content that match the search phrase or a variation of the search phrase. If no slides are determined to match the search phrase, and as described in more detail below, in some examples the dialog manager 140 may inform the presenter of the results of the search and/or query the presenter regarding desired next steps.

While the examples described herein refer to a single contextual knowledge graph, it will also be appreciated that speech information 178 may be analyzed using any suitable number of knowledge graphs and other suitable data sources. For example, voice input 128 may be analyzed using another knowledge graph (e.g. external knowledge graph 175) in addition to the contextual knowledge graph 156 to determine an action 168 to be performed by the presentation program 120 during the presentation.

With continued reference to the example of FIG. 1A, when the dialog manager 140 has determined an action 168 to be performed by the presentation program 120, the computing device 104 is configured to translate the action into one or more commands 170 executable by the presentation program 120 and/or the client device 116. As noted above, while the action 168 may comprise a generic understanding of a command and its parameters, the commands 170 comprise functional instructions executable by the presentation program 120.

In some examples, the orchestrator 136 is configured to translate the action 168 into one or more commands 170 executable by the presentation program to perform the action. In other examples, another component between the orchestrator 136 and presentation program interface 134 of the computing device 104 is configured to translate the action 168 into the one or more commands 170. As described in use-case examples provided below, the one or more commands 170 are then transmitted to the presentation program 120 for execution.

In some examples, the computing device 104 may participate in a contextual multi-turn conversation with a presenter to resolve a presenter's intent related to a voice input 128. For example, the computing device 104 may ask the presenter for more information before determining the action 168 to be performed by the presentation program 120. In other examples, the computing device 104 may ask the presenter for confirmation of the action 168.

In some examples after receiving speech information 178, the dialog manager 140 may determine a prompt 176, such as a query related to possible intent of the speech information. The dialog manager 140 may then send one or more prompt commands 174 that are executable by the presentation program 120 and/or other components of the client device 116 to provide the prompt 176 to the presenter.

In one example of a potential use-case scenario, the computing device 104 may receive from a presenter a voice input 128 comprising a command to "take me to the fiscal year 2020 roadmap slide." Based on receiving the voice input 128, the dialog manager 140 may query the contextual knowledge graph 156 to find one or more slides that contain information related to the phrase "fiscal year 2020 roadmap." If no match is found, the computing device 104 may generate a prompt 176, such as the information/query "I didn't find 'the fiscal year 2020 roadmap,' but I found the fiscal year 2018 performance. Would you like me to switch to that slide?" The prompt may be converted into a prompt command 174 that is executable by the presentation program 120 and/or other components of the client device 116 to provide the prompt to the presenter. For example, the prompt 176 may be communicated to the presenter via audio broadcast from a speaker of the client device 116, by displaying the prompt via the presentation program 120 or other display program, or in any other suitable manner.

The presenter may respond to the prompt 176 via a voice response 177. For example, after being asked "would you like me to switch to that slide?", the presenter may say "yes," "no," or provide additional instructions in response. The computing device 104 may receive the voice response 177 from the client device 116 and analyze the voice response 177 via the dialog manager 140 in a similar manner to the voice input 128. Based on analyzing the voice response 177 and using at least the contextual knowledge graph 156, the computing device 104 may proceed to determine the action 168 to be performed by the presentation program 120.

The computing device 104 may also use the voice inputs 128, voice responses 177 and/or other inputs in addition to the content 148 to populate the contextual knowledge graph 156. For example, the computing device 104 may receive additional speech information 178 from client device 116, such as presenter speech 180 spoken by the presenter during the presentation, or audience speech 182 spoken by one or more audience members. The computing device 104 may receive and analyze this speech information 178 in a similar manner as the voice input 128 and the voice response 177. The computing device 104 may then populate the contextual knowledge graph 156 with additional information based on such speech information 178.

For example, and with reference to FIG. 2, the presenter 208 may mention lakes and rivers while commenting on the slide 212. In this example, the presenter speech 180 may include the mention of the lakes and the rivers, which may accordingly be incorporated into the contextual knowledge graph 156. The presenter may later issue a voice input 128 to "go back to the slide where I mentioned the lakes and rivers." As the presenter's prior mention of the lakes and the rivers has been incorporated into the contextual knowledge graph 156, advantageously the computing device 104 may utilize the contextual knowledge graph to determine exactly which slide the presenter intends to navigate to, even if the lakes and the rivers are not included in the content 148 of the slide deck.

In a similar manner, and with reference again to FIG. 1A, audience speech 182 or conversations between one or more audience members and/or the presenter may be incorporated into the contextual knowledge graph 156. For example, and with reference again to FIG. 2, the presenter 208 may take questions from an audience member 240 or engage in a discussion with the audience member 240. In this example, the audience speech 182 may include these questions and the discussion and may be incorporated into the contextual knowledge graph 156.

In some examples, the audience speech 182 may indicate an identity of an audience member. In the example of FIG. 2, the audience speech 182 may include audience member 240 introducing herself as "Mary." By incorporating this information into the contextual knowledge graph 156, the computing device 104 may respond effectively to a voice input 128 that includes the identity of the audience member 240. For example, the presenter 208 may speak the instruction "go back to the slide where I had a discussion with Mary." As the identity of the audience member 240 has been incorporated into the contextual knowledge graph, the computing device 104 may determine exactly which slide the presenter intends to navigate to. It will also be appreciated that any other suitable information related to or otherwise contemporaneous with the presentation may be incorporated into the contextual knowledge graph 156, such as recordings, notes added to the slide deck, and time or other temporal information.

As described above, the computing device 104 may leverage the contextual knowledge graph 156 to provide voice-based assistance with many types of tasks. FIGS. 3-9 provide additional illustrative examples of tasks that may be carried out using the voice-based assistance techniques described herein.

Figure 3:
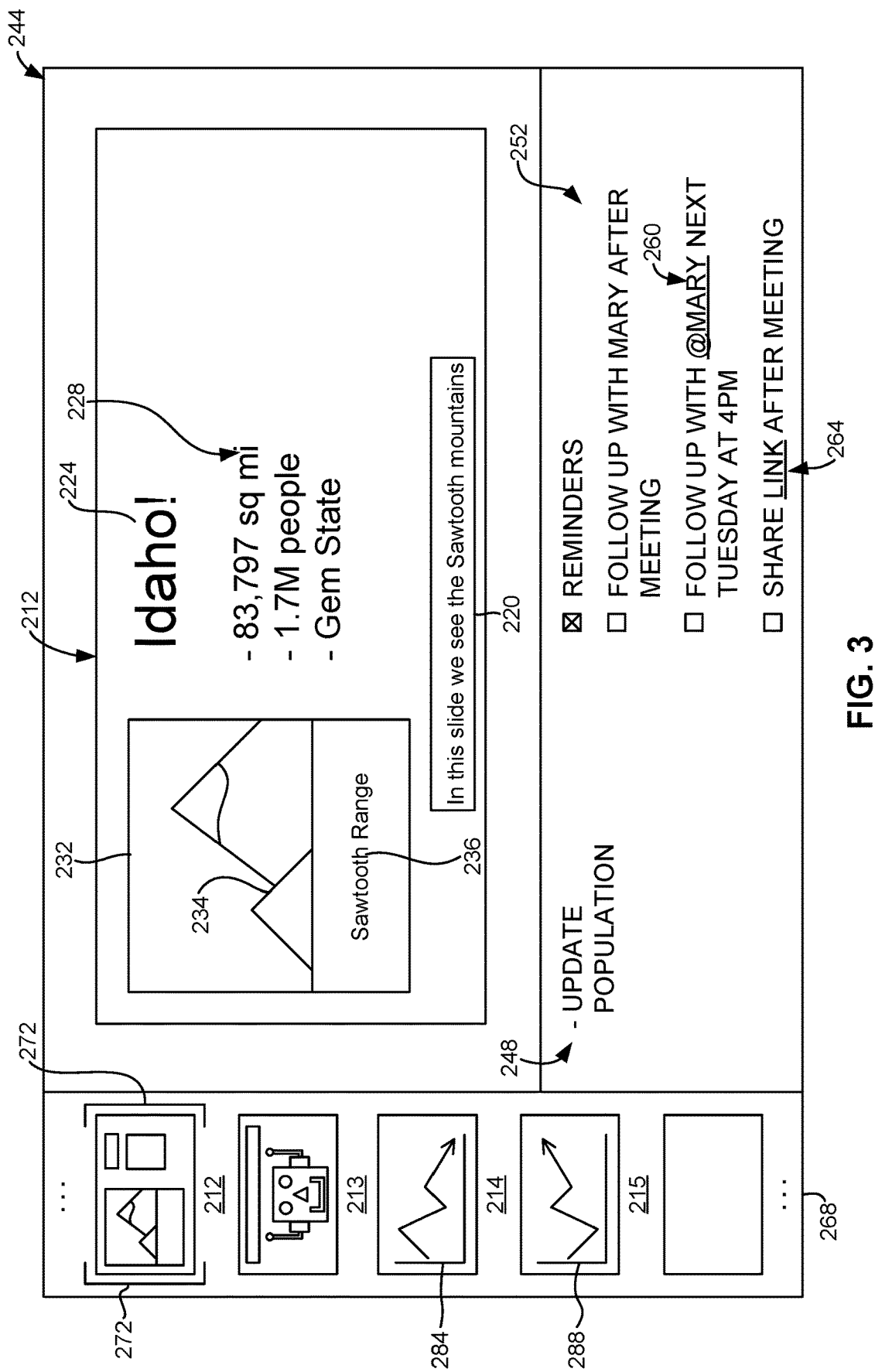
FIG. 3 illustrates an example of a slide displayed in a presenter view visible to the presenter of FIG. 2 according to examples of the present disclosure.

With reference now to FIG. 3, one example is illustrated depicting a presenter view 244 that includes the slide 212 of FIG. 2. The presenter view 244 may comprise a graphical user interface generated by presentation program 120 and displayed on the tablet computing device 204 that is visible to the presenter 208, but which is not intended to be presented to the audience 210 during the presentation. As illustrated in the example of FIG. 3, the presenter view 244 may comprise one or more notes 248 and/or one or more reminders 252.

In some examples, the presenter 208 may speak a voice input 128 to instruct the presentation program 120 to add a note 248 to slide 212 during the presentation. For example, the presenter may say "make a note to update population." Using the techniques described herein, the computing device 104 processes the presenter's voice input to cause presentation program 120 to add the requested note to slide 212. In another example, the presenter may say "add a note to each slide mentioning population to update the population." Using the techniques described herein, the computing device 104 processes the presenter's voice input to cause presentation program 120 to locate each slide that mentions population and add the requested note to those slides. In other examples, the presenter may instruct the presentation program 120 to take dictation of a question and/or answer from an audience member and record the transcribed speech.

In this example and in other examples, the presenter may speak and instruct the presentation program 120 to add one or more reminders 252 during the presentation. For example, the presenter may issue a voice input 128 stating "remind me to follow up with Mary after the presentation." Accordingly, the presentation program 120 may add a reminder 252 to "FOLLOW UP WITH MARY AFTER MEETING."

In other examples, the presentation program 120 may include additional information in one or more of the notes 248 or reminders 252. For example, the presentation program may add a contact link 260, such as an email address or a contact handle, to a reminder 252. As another example, the presentation program 120 may include a link 264 to a document or other content referenced by the presenter or an audience member. In some examples, such additional information may be retrieved from other sources, such as external knowledge graph 175.

In some examples, the computing device 104 may control the presentation program 120 to record audio before and/or after adding one or more notes 248 or reminders 252 to the slide deck. For example, the presentation program 120 may record a predetermined number of seconds of audio before and after adding a note 248. In this manner, the presenter or the computing device may later access the recorded audio to provide context for the note 248.

The presenter may also use the voice-based assistance techniques described herein to instruct the presentation program 120 to change to other modes. For example, after adding one or more notes 248 or reminders 252, the presenter may issue a voice command to switch from the presenter view 244 to a different view.

As another use-case example, the presenter may use voice inputs 128 to easily and flexibly navigate within a slide deck. In some examples, the presenter may utilize one or more voice inputs to advance or move back through the presentation in a linear order. For example, the presenter may speak instructions such as "next slide" to advance to a next slide or "previous slide" to return to a previous slide. In the example of FIG. 3, the presenter view 244 includes a slide navigator menu 268. The current slide 212 is highlighted in the slide navigator menu 268 by selector brackets 272, which serve to indicate a current slide being presented.

Figure 4:
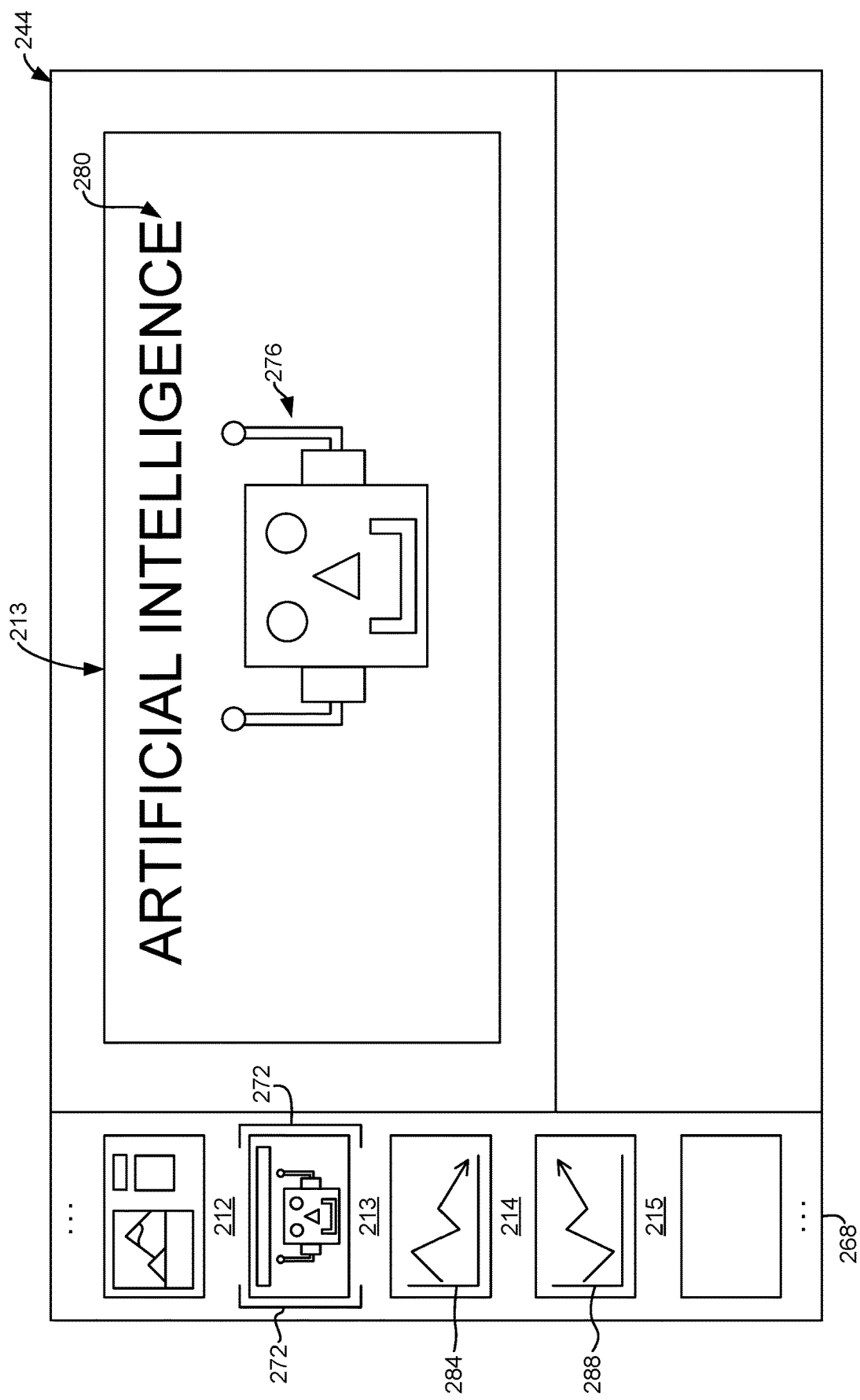
FIG. 4 shows an example of another slide displayed in a presenter view visible to the presenter of FIG. 2 according to examples of the present disclosure.

As described above, while presenting slide 212, the presenter may say "next slide." Accordingly, the presentation program is configured to advance the presentation one slide forward from slide 212 to slide 213, as shown in FIG. 4. In the example of FIG. 4, slide 213 is displayed in the presenter view 244, and is highlighted in the slide navigator menu 268 by the selector brackets 272.

Figure 5:
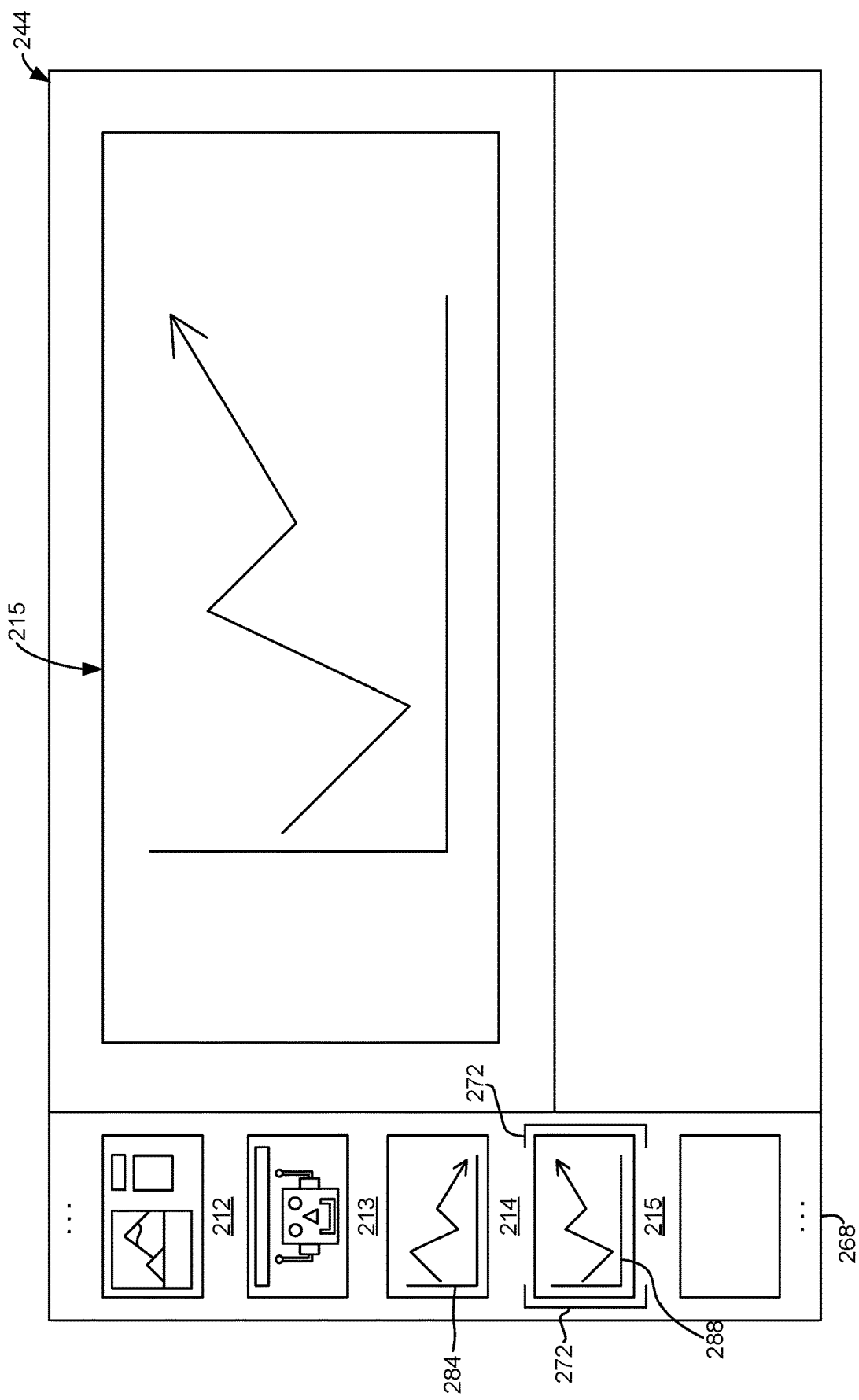
FIG. 5 shows another example of a slide displayed in a presenter view visible to the presenter of FIG. 2 according to examples of the present disclosure.
Figure 6:
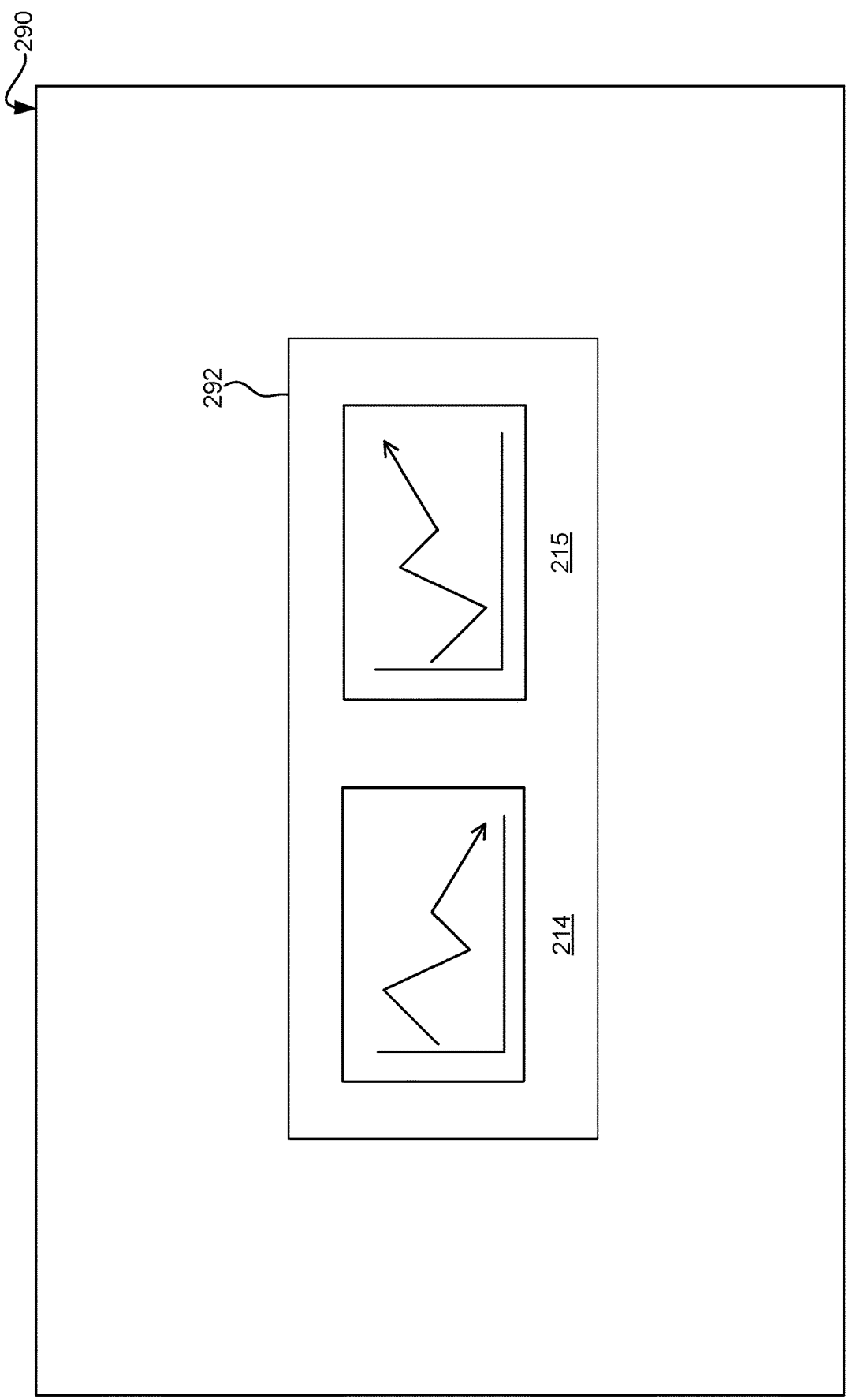
FIG. 6 shows another example of a presenter view visible to the presenter of FIG. 2 in which two slides are displayed in a selection box according to examples of the present disclosure.

In other examples, the voice-based and context-aware assistance techniques of the present disclosure enable a presenter to navigate among slides in a slide deck in a non-linear order. For example, while presenting slide 212 as illustrated in FIG. 3, the presenter may say "go to slide 215." By leveraging the slide deck content 148 in the contextual knowledge graph 156, the techniques described herein cause the presentation program 120 to identify, advance to and display slide 215, as shown in FIG. 5. In other examples, the presenter may provide other navigation commands, such as "go back to the beginning," "jump to the very last slide," "go to the slide showing the mountains," and similar commands to conveniently navigate to a desired slide.

For example, and with reference again to FIG. 3, while presenting the slide 212 the presenter may provide a voice input 128 to "go to the slide that contains artificial intelligence." Based on receiving the voice input 128, the computing device 104 may query the contextual knowledge graph 156 to locate slide(s) that contains information related to "artificial intelligence." For example and as shown in FIG. 4, slide 213 includes a title 280 reading "ARTIFICIAL INTELLIGENCE." Based on identifying the title 280 as corresponding to "artificial intelligence," the computing device 104 instructs the presentation program 120 to navigate to slide 213.

As another example, the presenter may provide a voice command to "show the slide with the results graph." In this example, more than one slide may correspond to "the results graph." For example, as indicated in the slide navigator menu 268 of FIGS. 3-5, slide 214 includes a graph 284 and slide 215 includes a graph 288. Accordingly, in this example the computing device 104 may prompt the presenter to confirm which slide to navigate to. For example, the computing device 104 may cause the presentation program 120 to highlight slides 214 and 215 in the presenter view 244 and provide an audio prompt: "which of these two slides would you like me to show?" In another example and with reference to FIG. 6, the computing device 104 may control the presentation program 120 to display a modified presenter view 290 in which slides 214 and slide 215 are displayed in a selection box 292. The presenter may then select which slide to navigate to by using a voice input, such as "slide 214."

In other examples, the presenter may use a voice input 128 to select one or more content items in a slide deck. For example, and with reference again to FIG. 2, the presenter may use voice commands to select one or more objects in slide 212, such as particular text or the image 232 of mountains 234. In different examples, selecting the one or more objects may include highlighting or otherwise indicating the object(s).

Figure 7:
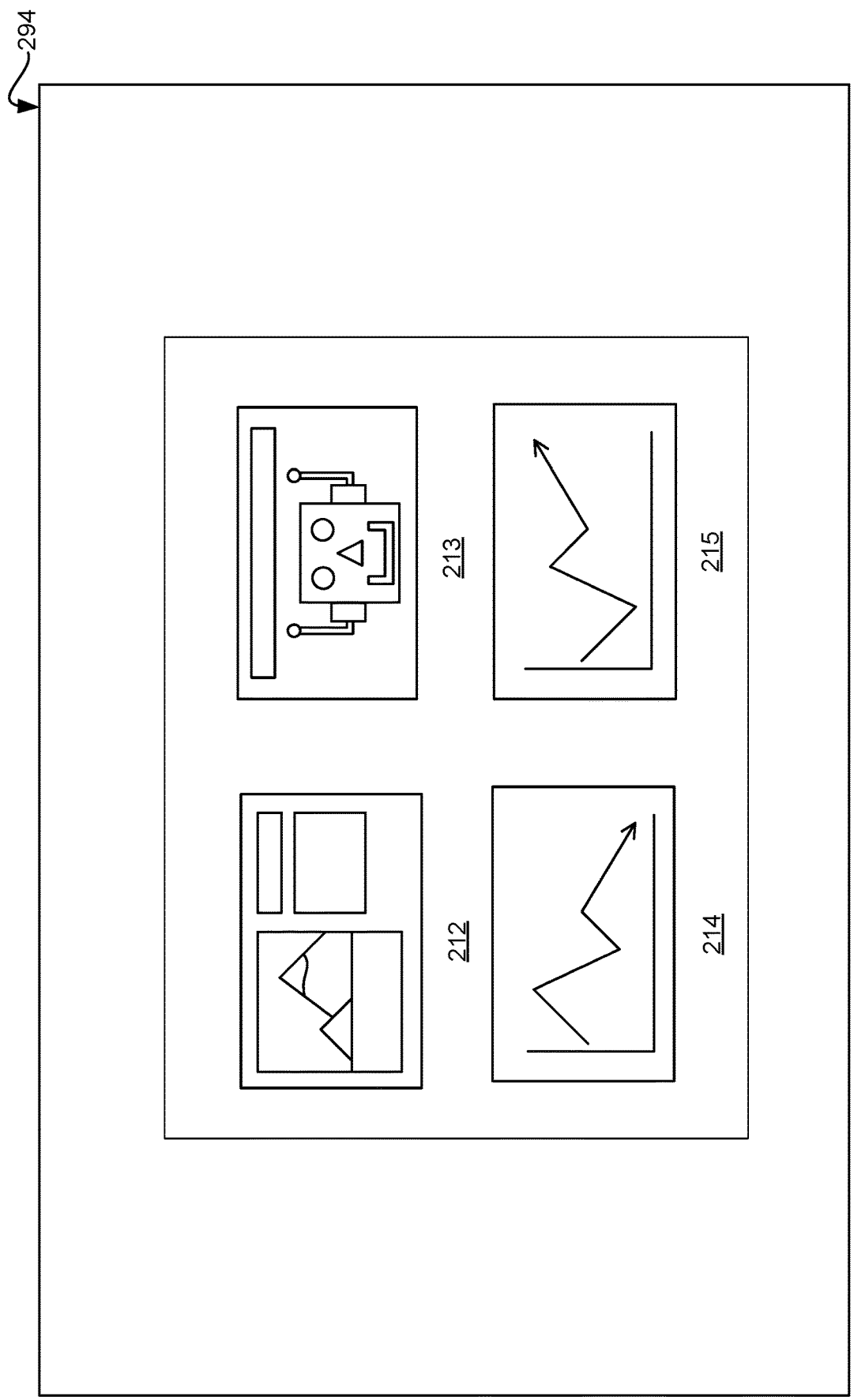
FIG. 7 shows an example of a slide-sorter view visible to the presenter of FIG. 2 according to examples of the present disclosure.
Figure 8:
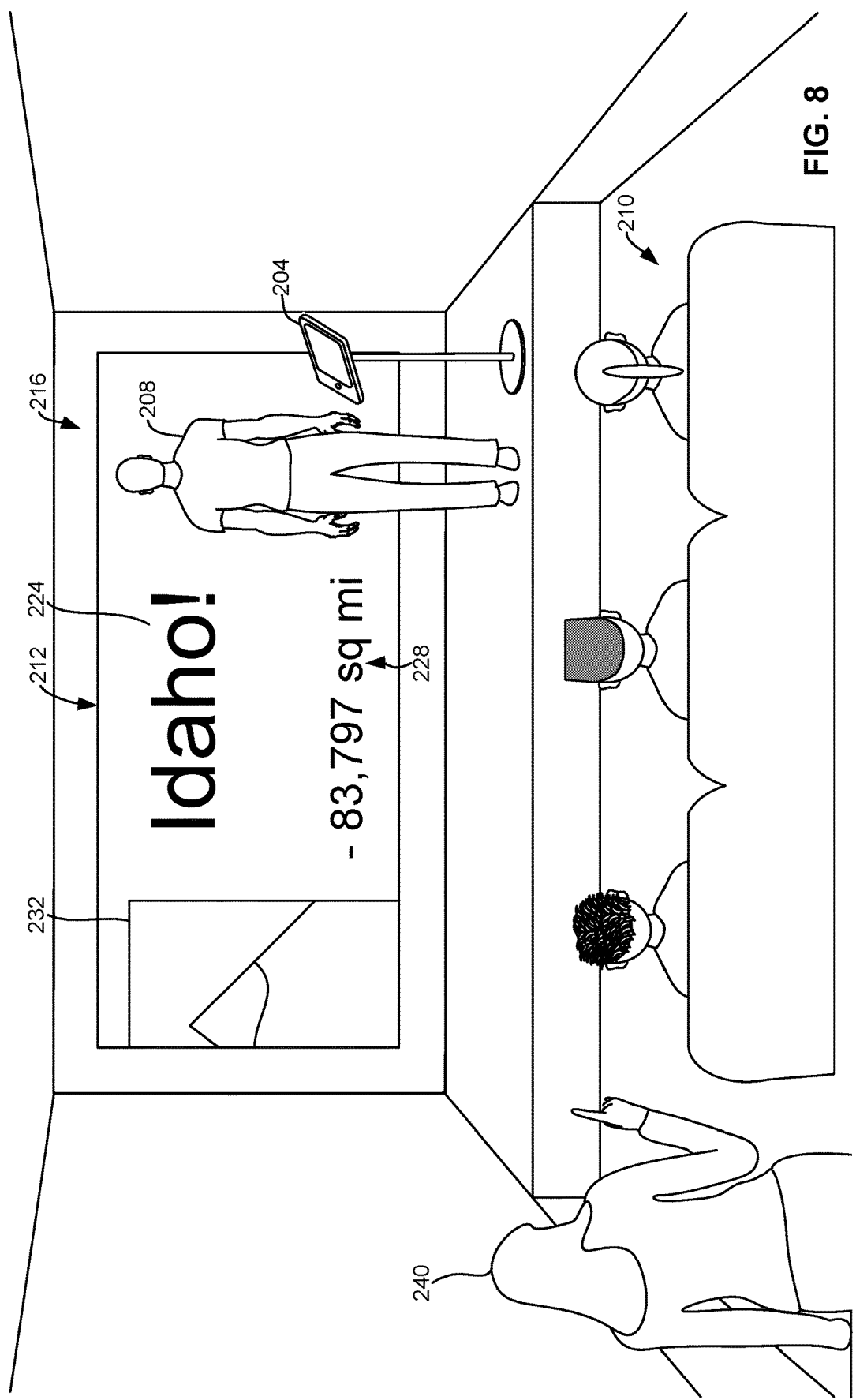
FIG. 8 shows an example of zooming into the center of the slide shown in FIG. 2 according to examples of the present disclosure.

In some examples, the voice input 128 may comprise a command to zoom into or zoom out of a slide or an object within a slide. For example, and with reference to FIG. 3, the presenter may use a voice command to instruct the presentation program 120 to zoom out of the current slide 212 and access a slide-sorter view. FIG. 7 shows an example of a slide-sorter view 294. In the slide-sorter view 294, like the presenter view 290, the presenter may select and/or navigate to a different slide by speaking instructions, such as "select slide 214" or "zoom into slide 214."

Similarly, while presenting the slide 212 as shown in FIG. 2, the presenter 208 may use voice input 128 to zoom into the slide or any object on the slide. In one example, the presenter may issue a voice command to "zoom in." Accordingly, as illustrated by example in FIG. 8, the presentation program may be controlled to zoom into the center of the slide 212.

As another example, while presenting the slide 212 as shown in FIG. 2, the presenter 208 may speak a voice input 128 to "zoom into the image of the mountains." Accordingly, as illustrated by example in FIG. 9, the presentation program may be controlled to zoom into the image 232. It will also be appreciated that the presentation program may be configured to zoom into any other suitable portion of the slide to any suitable level of magnification.

Figure 10A:
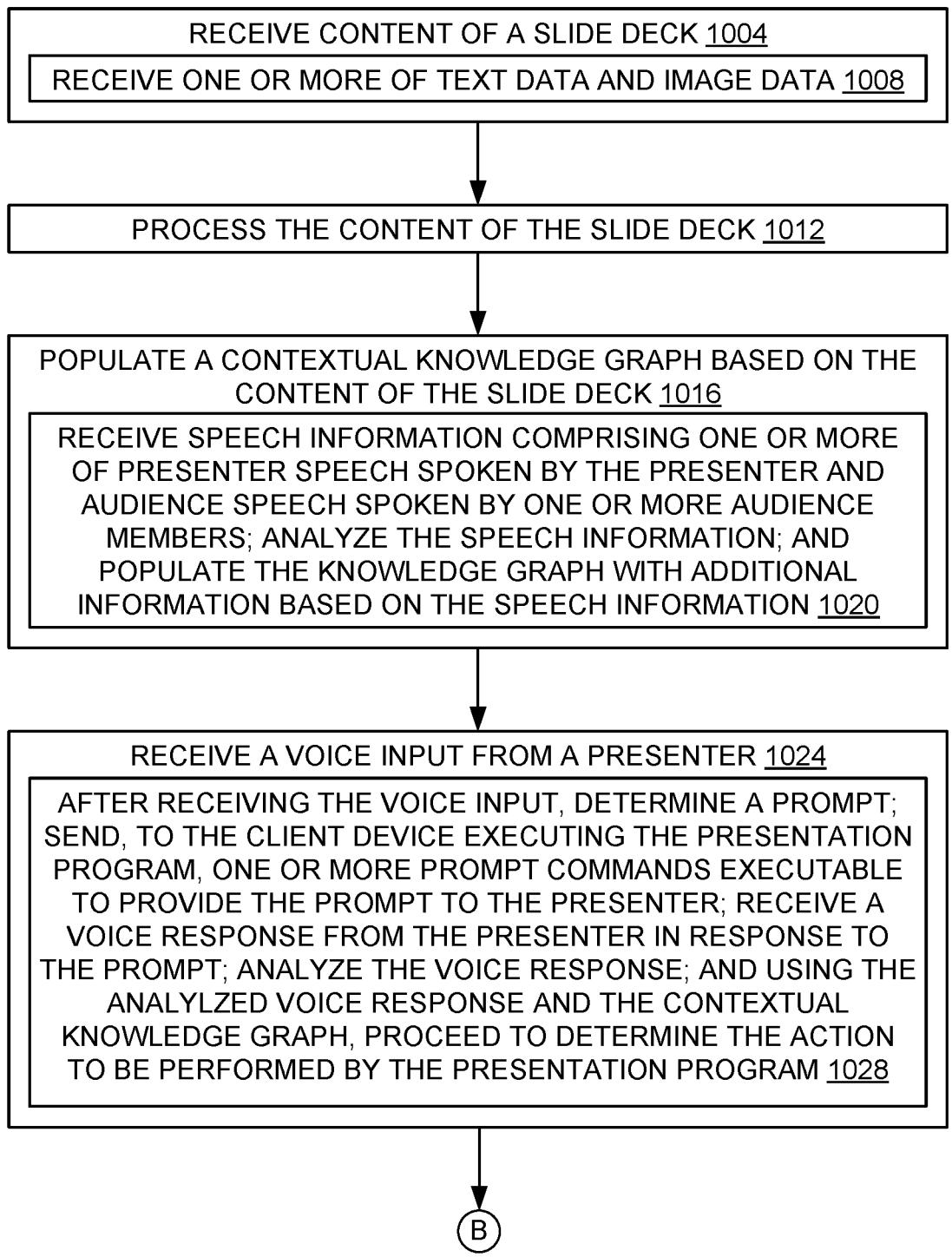
FIGS. 10A-10B show a flow diagram of an example method for providing voice-based assistance during a presentation according to examples of the present disclosure.
Figure 10B:
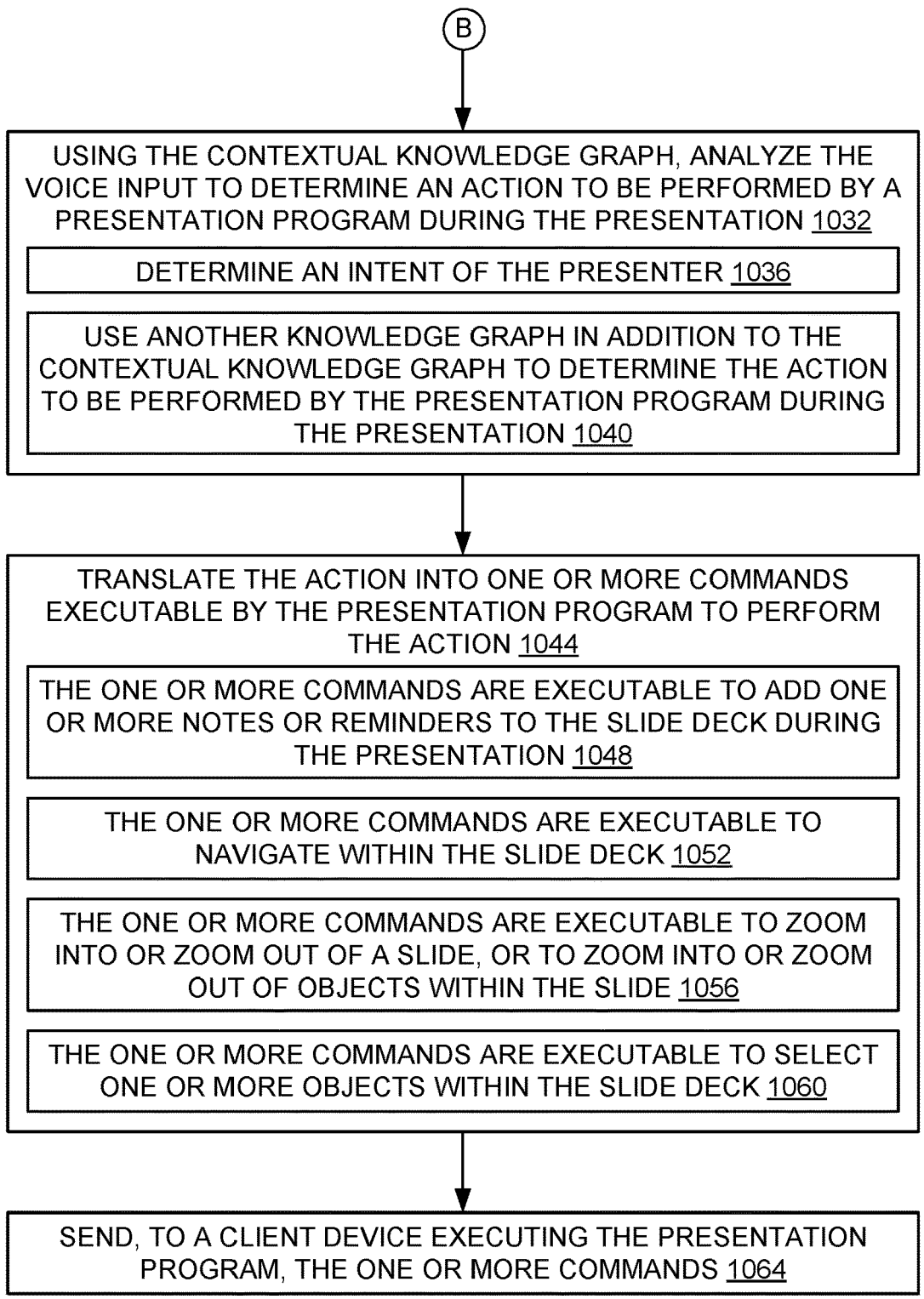

With reference now to FIGS. 10A-10B, a flow chart is illustrated of an example method 1000 for providing voice-based assistance during a presentation. The following description of method 1000 is provided with reference to the software and hardware components described herein and shown in FIGS. 1-9 and 11. It will be appreciated that method 1000 also may be performed in other contexts using other suitable hardware and software components.

With reference to FIG. 10A, at 1004, the method 1000 includes receiving content of a slide deck. At 1008, the method 1000 may include receiving one or more of text data and image data. At 1012, the method 1000 includes processing the content of the slide deck. At 1016, the method 1000 includes populating a contextual knowledge graph based on the content of the slide deck. At 1020, the method 1000 may include receiving speech information comprising one or more of presenter speech spoken by the presenter and audience speech spoken by one or more audience members; analyzing the speech information; and populating the knowledge graph with additional information based on the speech information.

At 1024, the method 1000 includes receiving a voice input from a presenter. At 1028, the method 1000 may include, after receiving the voice input, determining a prompt; sending, to the client device executing the presentation program, one or more prompt commands executable to provide the prompt to the presenter; receiving a voice response from the presenter in response to the prompt; analyzing the voice response; and using the analyzed voice response and the contextual knowledge graph, proceeding to determine the action to be performed by the presentation program.

With reference now to FIG. 10B, at 1032, the method 1000 includes using the contextual knowledge graph, analyzing the voice input to determine an action to be performed by a presentation program during the presentation. At 1036, the method 1000 may include determining an intent of the presenter. At 1040, the method 1000 may include using another knowledge graph in addition to the contextual knowledge graph to determine the action to be performed by the presentation program during the presentation.

At 1044, the method 1000 includes translating the action into one or more commands executable by the presentation program to perform the action. At 1048, the method 1000 may include, wherein the one or more commands are executable to add one or more notes or reminders to the slide deck during the presentation.

At 1052, the method 1000 may include, wherein the one or more commands are executable to navigate within the slide deck. At 1056, the method 1000 may include, wherein the one or more commands are executable to zoom into or zoom out of a slide, or to zoom into or zoom out of objects within the slide. At 1060, the method 1000 may include, wherein the one or more commands are executable to select one or more objects within the slide deck. At 1064, the method 1000 includes sending, to a client device executing the presentation program, the one or more commands.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
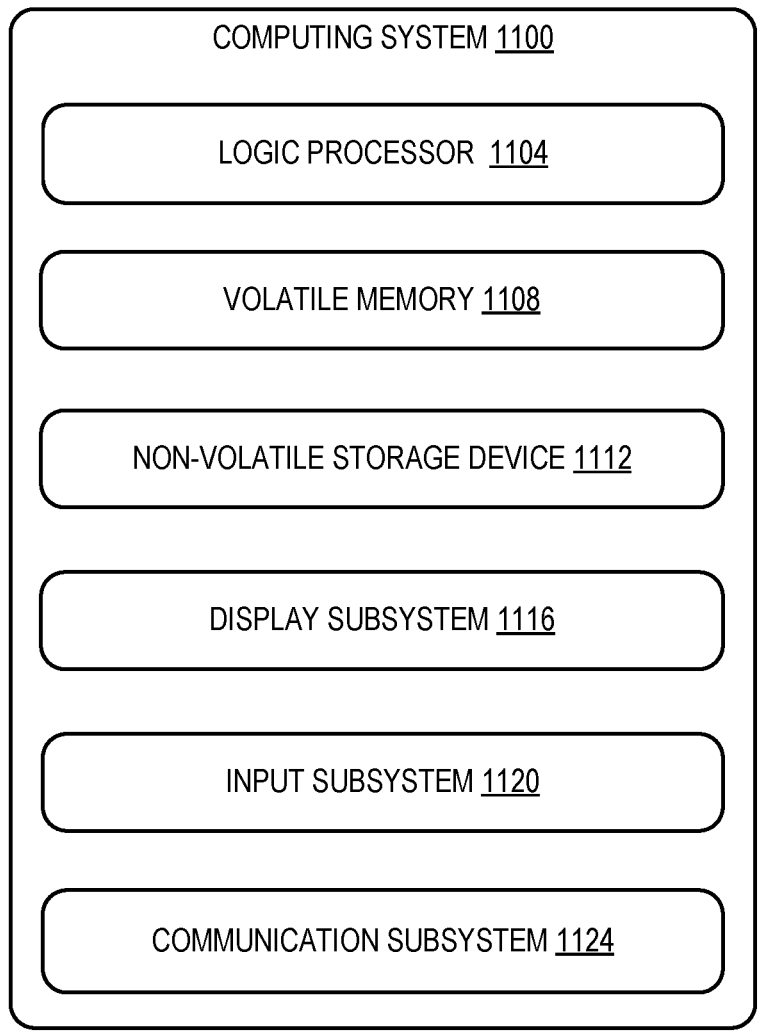
FIG. 11 is a block diagram of an example computing system according to examples of the present disclosure.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices or consoles, mobile computing devices, mobile communication devices (e.g., smart phones), and/or other computing devices. In the above examples, computing device 104, client device 116, and tablet computing device 204 may comprise computing system 1100 or one or more aspects of computing system 1100.

Computing system 1100 includes a logic processor 1104, volatile memory 1108, and a non-volatile storage device 1112. Computing system 1100 may optionally include a display subsystem 1116, input subsystem 1120, communication subsystem 1124, and/or other components not shown in FIG. 11.

Logic processor 1104 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1104 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1104 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1112 includes one or more physical devices configured to hold instructions executable by the logic processors to implement the methods and processes described herein. When such methods and processes are implemented, the state of non-volatile storage device 1112 may be transformed—e.g., to hold different data.

Non-volatile storage device 1112 may include physical devices that are removable and/or built-in. Non-volatile storage device 1112 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1112 may include nonvolatile, dynamic, static, read/write, read-only, sequential-access, location-addressable, file-addressable, and/or content-addressable devices. It will be appreciated that non-volatile storage device 1112 is configured to hold instructions even when power is cut to the non-volatile storage device 1112.

Volatile memory 1108 may include physical devices that include random access memory. Volatile memory 1108 is typically utilized by logic processor 1104 to temporarily store information during processing of software instructions. It will be appreciated that volatile memory 1108 typically does not continue to store instructions when power is cut to the volatile memory 1108.

Aspects of logic processor 1104, volatile memory 1108, and non-volatile storage device 1112 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1100 typically implemented in software by a processor to perform a particular function using portions of volatile memory, which function involves transformative processing that specially configures the processor to perform the function. Thus, a program or application may be instantiated via logic processor 1104, executing instructions held by non-volatile storage device 1112, using portions of volatile memory 1108. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1116 may be used to present a visual representation of data held by non-volatile storage device 1112. As the herein described methods and processes change the data held by the non-volatile storage device, and thus transform the state of the non-volatile storage device, the state of display subsystem 1116 may likewise be transformed to visually represent changes in the underlying data. Display subsystem 1116 may include one or more display devices utilizing virtually any type of technology. Such display devices may be combined with logic processor 1104, volatile memory 1108, and/or non-volatile storage device 1112 in a shared enclosure, or such display devices may be peripheral display devices.

When included, input subsystem 1120 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1124 may be configured to communicatively couple various computing devices described herein with each other, and with other devices. Communication subsystem 1124 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

The following paragraphs provide additional support for the claims of the subject application. One aspect provides, at a computing device, a method for providing voice-based assistance during a presentation, the method comprising: receiving content of a slide deck; processing the content of the slide deck; populating a contextual knowledge graph based on the content of the slide deck; receiving a voice input from a presenter; using the contextual knowledge graph, analyzing the voice input to determine an action to be performed by a presentation program during the presentation; translating the action into one or more commands executable by the presentation program to perform the action; and sending, to a client device executing the presentation program, the one or more commands.

The method may additionally or alternatively include receiving speech information comprising one or more of presenter speech spoken by the presenter and audience speech spoken by one or more audience members; analyzing the speech information; and populating the knowledge graph with additional information based on the speech information. The method may additionally or alternatively include, wherein receiving the content of the slide deck comprises receiving one or more of text data and image data.

The method may additionally or alternatively include, after receiving the voice input, determining a prompt; sending, to the client device executing the presentation program, one or more prompt commands executable to provide the prompt to the presenter; receiving a voice response from the presenter in response to the prompt; analyzing the voice response; and using the analyzed voice response and the contextual knowledge graph, proceeding to determine the action to be performed by the presentation program. The method may additionally or alternatively include, wherein analyzing the voice input comprises determining an intent of the presenter.

The method may additionally or alternatively include, wherein analyzing the voice input further comprises using another knowledge graph in addition to the contextual knowledge graph to determine the action to be performed by the presentation program during the presentation. The method may additionally or alternatively include, wherein the one or more commands are executable to add one or more notes or reminders to the slide deck during the presentation. The method may additionally or alternatively include, wherein the one or more commands are executable to navigate within the slide deck.

The method may additionally or alternatively include, wherein the one or more commands are executable to zoom into or zoom out of a slide, or to zoom into or zoom out of objects within the slide. The method may additionally or alternatively include, wherein the one or more commands are executable to select one or more objects within the slide deck.

Another aspect provides a computing device, comprising: a logic subsystem comprising a processor; and a memory storing instructions executable by the logic subsystem to: receive content of a slide deck; process the content of the slide deck; populate a contextual knowledge graph based on the content of the slide deck; receive a voice input from a presenter; using the contextual knowledge graph, analyze the voice input to determine an action to be performed by a presentation program during the presentation; translate the action into one or more commands executable by the presentation program to perform the action; and send, to a client device executing the presentation program, the one or more commands. The computing device may additionally or alternatively include, wherein the instructions are further executable to: receive speech information comprising one or more of presenter speech spoken by the presenter and audience speech spoken by one or more audience members; analyze the speech information; and populate the knowledge graph with additional information based on the speech information.

The computing device may additionally or alternatively include, wherein receiving the content of the slide deck comprises receiving one or more of text data and image data. The computing device may additionally or alternatively include, wherein the instructions are further executable to: after receiving the voice input, determine a prompt; send, to the client device executing the presentation program, one or more prompt commands executable to provide the prompt to the presenter; receive a voice response from the presenter in response to the prompt; analyze the voice response; and using the analyzed voice response and the contextual knowledge graph, proceed to determine the action to be performed by the presentation program.

The computing device may additionally or alternatively include, wherein analyzing the voice input comprises determining an intent of the presenter. The computing device may additionally or alternatively include, wherein the one or more commands are executable to add one or more notes or reminders to the slide deck during the presentation. The computing device may additionally or alternatively include, wherein the one or more commands are executable to navigate within the slide deck.

The computing device may additionally or alternatively include, wherein the one or more commands are executable to zoom into or zoom out of a slide, or to zoom into or zoom out of objects within the slide. The computing device may additionally or alternatively include, wherein the one or more commands are executable to select one or more objects within the slide deck.

Another aspect provides a computing device, comprising: a logic subsystem comprising a processor; and a memory storing instructions executable by the logic subsystem to: receive content of a slide deck; process the content of the slide deck; populate a contextual knowledge graph based on the content of the slide deck; receive a voice input from a presenter; using the contextual knowledge graph, analyze the voice input to determine an action to be performed by a presentation program during a presentation; translate the action into one or more commands executable by the presentation program to perform the action; control the presentation program to execute the one or more commands; and send, to a client device, display output resulting from execution of the one or more commands.

As used herein, the phrase "and/or" means any or all of multiple stated possibilities.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing device, a method for providing voice-based assistance during a presentation, the method comprising:
   receiving content of a slide deck;
   processing the content of the slide deck;
   populating a contextual knowledge graph based on the content of the slide deck;
   receiving speech information comprising audience speech spoken by an audience member during the presentation, the audience speech indicating an identity of the audience member;
   populating the contextual knowledge graph with the identity of the audience member;
   receiving a voice input from a presenter, the voice input comprising the identity of the audience member and an instruction to navigate to a slide of the slide deck that is associated with the identity of the audience member;

using the contextual knowledge graph, analyzing the voice input to determine an action to be performed by a presentation program during the presentation;
translating the action into one or more commands executable by the presentation program to perform the action, wherein the one or more commands are executable to navigate to the slide; and
sending, to a client device executing the presentation program, the one or more commands.

2. The method of claim 1, further comprising:
receiving additional speech information comprising presenter speech spoken by the presenter;
analyzing the additional speech information; and
populating the contextual knowledge graph with additional information based on the additional speech information.

3. The method of claim 1, wherein receiving the content of the slide deck comprises receiving one or more of text data and image data.

4. The method of claim 1, further comprising:
after receiving the voice input, determining a prompt;
sending, to the client device executing the presentation program, one or more prompt commands executable to provide the prompt to the presenter;
receiving a voice response from the presenter in response to the prompt;
analyzing the voice response; and
using the analyzed voice response and the contextual knowledge graph, proceeding to determine the action to be performed by the presentation program.

5. The method of claim 1, wherein analyzing the voice input comprises determining an intent of the presenter.

6. The method of claim 1, wherein analyzing the voice input further comprises using another knowledge graph in addition to the contextual knowledge graph to determine the action to be performed by the presentation program during the presentation.

7. The method of claim 1, wherein the one or more commands are executable to add one or more notes or reminders to the slide deck during the presentation.

8. The method of claim 1, wherein the one or more commands are executable to navigate between slides in a non-linear order.

9. The method of claim 1, wherein the one or more commands are executable to zoom into or zoom out of the slide, or to zoom into or zoom out of objects within the slide.

10. The method of claim 1, wherein the one or more commands are executable to select one or more objects within the slide deck.

11. A computing device, comprising:
a logic subsystem comprising a processor; and
a memory storing instructions executable by the logic subsystem to:
receive content of a slide deck;
process the content of the slide deck;
populate a contextual knowledge graph based on the content of the slide deck;
receive speech information comprising audience speech spoken by an audience member during a presentation, the audience speech indicating an identity of the audience member;
populate the contextual knowledge graph with the identity of the audience member;
receive a voice input from a presenter, the voice input comprising the identity of the audience member and an instruction to navigate to a slide of the slide deck that is associated with the identity of the audience member;
using the contextual knowledge graph, analyze the voice input to determine an action to be performed by a presentation program during the presentation;
translate the action into one or more commands executable by the presentation program to perform the action, wherein the one or more commands are executable to navigate to the slide; and
send, to a client device executing the presentation program, the one or more commands.

12. The computing device of claim 11, wherein the instructions are further executable to:
receive additional speech information comprising presenter speech spoken by the presenter;
analyze the additional speech information; and
populate the contextual knowledge graph with additional information based on the additional speech information.

13. The computing device of claim 11, wherein receiving the content of the slide deck comprises receiving one or more of text data and image data.

14. The computing device of claim 11, wherein the instructions are further executable to:
after receiving the voice input, determine a prompt;
send, to the client device executing the presentation program, one or more prompt commands executable to provide the prompt to the presenter;
receive a voice response from the presenter in response to the prompt;
analyze the voice response; and
using the analyzed voice response and the contextual knowledge graph, proceed to determine the action to be performed by the presentation program.

15. The computing device of claim 11, wherein analyzing the voice input comprises determining an intent of the presenter.

16. The computing device of claim 11, wherein the one or more commands are executable to add one or more notes or reminders to the slide deck during the presentation.

17. The computing device of claim 11, wherein the one or more commands are executable to navigate between slides in a non-linear order.

18. The computing device of claim 11, wherein the one or more commands are executable to zoom into or zoom out of the slide, or to zoom into or zoom out of objects within the slide.

19. The computing device of claim 11, wherein the one or more commands are executable to select one or more objects within the slide deck.

20. A computing device, comprising:
a logic subsystem comprising a processor; and
a memory storing instructions executable by the logic subsystem to:
receive content of a slide deck;
process the content of the slide deck;
populate a contextual knowledge graph based on the content of the slide deck;
receive speech information comprising audience speech spoken by an audience member during a presentation, the audience speech indicating an identity of the audience member;
populate the contextual knowledge graph with the identity of the audience member;
receive a voice input from a presenter, the voice input comprising the identity of the audience member and an instruction to navigate to a slide of the slide deck that is associated with the identity of the audience member;
using the contextual knowledge graph, analyze the voice input to determine an action to be performed by a presentation program during the presentation;
translate the action into one or more commands executable by the presentation program to perform the action, wherein the one or more commands are executable to navigate to the slide;
control the presentation program to execute the one or more commands; and
send, to a client device, display output resulting from execution of the one or more commands.

* * * * *